US012779816B2

(12) United States Patent
Feng

(10) Patent No.: US 12,779,816 B2
(45) Date of Patent: Nov. 3, 2026

(54) MODIFIED STRAW WASTE COMPOSITE BOARD AND PREPARATION METHOD THEREOF

(71) Applicant: Shenzhen Haoxiqi Consulting Management Co., Ltd., Shenzhen (CN)

(72) Inventor: Yubo Feng, Shenzhen (CN)

( * ) Notice: Subject to any disclaimer, the term of this patent is extended or adjusted under 35 U.S.C. 154(b) by 289 days.

(21) Appl. No.: 18/828,325

(22) Filed: Sep. 9, 2024

(65) Prior Publication Data

US 2026/0021644 A1 Jan. 22, 2026

(30) Foreign Application Priority Data

Jul. 18, 2024 (CN) ......................... 202410964851.1

(51) Int. Cl.
*B32B 5/26* (2006.01)
*B29C 43/00* (2006.01)
(Continued)

(52) U.S. Cl.
CPC ............ *B32B 5/266* (2021.05); *B29C 43/003* (2013.01); *B29C 43/206* (2013.01); *B29C 43/52* (2013.01); *B32B 5/022* (2013.01); *B32B 15/02* (2013.01); *B32B 15/14* (2013.01); *B29K 2001/08* (2013.01); *B29K 2003/00* (2013.01); *B29K 2029/04* (2013.01); *B29K 2031/04* (2013.01); *B29K 2105/0809* (2013.01); *B29K 2105/0854* (2013.01); *B29K 2105/16* (2013.01); *B29K 2309/02* (2013.01); *B29K 2309/08* (2013.01); *B29K 2311/10* (2013.01); *B29K 2507/04* (2013.01); *B29K 2509/02* (2013.01); *B29K 2995/0015* (2013.01); *B29K 2995/0077* (2013.01); *B32B 2260/023* (2013.01);
(Continued)

(58) Field of Classification Search
None
See application file for complete search history.

(56) References Cited

FOREIGN PATENT DOCUMENTS

CN 101934679 A * 1/2011
CN 117986987 * 5/2024

OTHER PUBLICATIONS

CN101934679A translation (Year: 2011).*
CN117986987A translation (Year: 2024).*

* cited by examiner

*Primary Examiner* — Rita P Adhlakha

(57) ABSTRACT

A modified straw waste composite board and a preparation method thereof. The composite board sequentially comprises a surface layer, a substrate layer, a weight reduction layer, and a protective layer from top to bottom. The invention significantly enhances the comprehensive performance of composite boards by introducing innovative materials such as phosphorus-doped straw-based porous carbon, zinc oxide quantum dots, modified emulsified asphalt, and nano-silicon dioxide. Straw waste has abundant pore structures and excellent mechanical properties, which can improve the flame retardancy and mechanical properties of composite boards; zinc oxide quantum dots can extend the lifespans of composite boards; through scientifically designed components and advanced manufacturing processes, the invention solves the shortcomings of traditional boards, and achieves high-value utilization of agricultural waste, providing new ideas and technical support for the development and application of environmentally friendly composite materials.

6 Claims, 1 Drawing Sheet

(51) Int. Cl.

| | |
|---|---|
| ***B29C 43/20*** | (2006.01) |
| ***B29C 43/52*** | (2006.01) |
| ***B29K 1/00*** | (2006.01) |
| ***B29K 29/00*** | (2006.01) |
| ***B29K 31/00*** | (2006.01) |
| ***B29K 105/08*** | (2006.01) |
| ***B29K 105/16*** | (2006.01) |
| ***B29K 309/02*** | (2006.01) |
| ***B29K 309/08*** | (2006.01) |
| ***B29K 311/10*** | (2006.01) |
| ***B29K 507/04*** | (2006.01) |
| ***B29K 509/02*** | (2006.01) |
| ***B32B 5/02*** | (2006.01) |
| ***B32B 15/02*** | (2006.01) |
| ***B32B 15/14*** | (2006.01) |

(52) U.S. Cl.

CPC ... *B32B 2260/046* (2013.01); *B32B 2262/101* (2013.01); *B32B 2262/108* (2013.01); *B32B 2264/065* (2013.01); *B32B 2264/1025* (2020.08); *B32B 2264/104* (2013.01); *B32B 2307/302* (2013.01); *B32B 2307/54* (2013.01); *B32B 2307/712* (2013.01)

MODIFIED STRAW WASTE COMPOSITE BOARD AND PREPARATION METHOD THEREOF

1. TECHNICAL FIELD

The invention relates to the technical field of composite boards, in particular to a modified straw waste composite board and a preparation method thereof.

2. BACKGROUND ART

With the increasingly serious global environmental issues, the effective utilization of straw waste has become one of the hot research topics, especially in the manufacturing of composite boards. However, existing straw waste composite boards still have significant deficiencies in mechanical performance, durability, and environmental properties. Traditional straw waste composite boards suffer from poor mechanical properties such as low bending strength, compressive strength, and toughness; their durability issues mainly manifest in poor water resistance and corrosion resistance, making them prone to moisture absorption, mold, and decay; in addition, the large amount of chemical adhesives used in the production process not only harm the environment, but also release toxic gases, impacting the health of users.

In addition to the above drawbacks, existing straw waste composite boards also face challenges in processing performance and surface treatment. During processing, the boards are prone to cracking and deformation, with poor thermal stability that affects aesthetics and decorative performance, thereby limiting their application in high-end products. These problems severely restrict the widespread use and market promotion of straw waste composite boards. Therefore, improving existing technologies and developing straw waste composite boards with superior performance are urgent tasks to address.

3. SUMMARY OF THE INVENTION

In view of the above situation, in order to overcome the defects of the prior art, the invention provides a modified straw waste composite board and a preparation method thereof.

In order to achieve the above objects, the technical scheme adopted by the invention is as follows: the invention proposes a modified straw waste composite board, sequentially comprising a surface layer, a substrate layer, a weight reduction layer, and a protective layer from top to bottom;

the surface layer comprises the following components in parts by weight: 25-43 parts of phosphorus-doped straw-based porous carbon, 10-20 parts of zinc oxide quantum dots, 50-100 parts of magnesium oxide, 30-40 parts of magnesium chloride, 0.4-0.6 parts of 30 wt % hydrochloric acid, 1-6 parts of oxalic acid, 3-6 parts of hydroxyethyl cellulose, 0.5-0.8 parts of sodium lignosulfonate, 1.6-2 parts of white latex, 2-6 parts of polyvinyl alcohol, 3-8 parts of light calcium carbonate and 50 parts of water, as well as a glass fiber cloth and a non-woven fiber cloth;

the substrate layer comprises the following components in parts by weight: 40-100 parts of phosphorus-doped straw-based porous carbon, 4-6 parts of nano-silicon dioxide, 1-4 parts of silane coupling agent, 20-40 parts of starch glue, 4-7 parts of hydroxymethyl cellulose, 1-10 parts of foaming agent, 0.2-0.4 parts of ammonium chloride, 2-12 parts of modified urea-formaldehyde resin, 1-3 parts of hemp fiber, 50 parts of water, and two sheets of non-woven fiber cloth;

the weight reduction layer comprises the following components in parts by weight: 60-100 parts of phosphorus-doped straw-based porous carbon, 5-10 parts of zinc oxide quantum dots, 4-12 parts of modified emulsified asphalt, 3-8 parts of fabric fiber, 1-6 parts of chopped glass fiber, 3-8 parts of urea-formaldehyde resin and 0.5-5 parts of silane coupling agent, as well as a metal mesh and a non-woven fiber cloth;

the protective layer comprises the following components in parts by weight: 40-60 parts of phosphorus-doped straw-based porous carbon, 6-14 parts of polyvinyl acetate emulsion, 1.6-3 parts of hydroxymethyl cellulose, 0.8-1.5 parts of polyvinyl butyral-phenolic adhesive, 3-6 parts of polyvinyl alcohol, 1-10 parts of starch glue and 1-8 parts of basalt fiber, as well as a bamboo fiber mesh, a glass fiber cloth and a basalt fiber mesh.

Preferably, a method for preparing the phosphorus-doped straw-based porous carbon comprises the following steps:

I. washing the straw waste twice with water and air-drying it, then feeding it into a grinder for crushing to obtain straw powder with a particle size of 2±0.5 mm;

II. Weighing 3-5 g of the straw powder prepared in step I, adding it to 200 mL of 1-2 mol/L phosphoric acid solution, mixing thoroughly, and then transferring the mixture to a reactor lined with polytetrafluoroethylene, heating the mixture at 160-200° C. for 8-12 hours; after cooling to room temperature, filtering to collect precipitate, placing it in an oven at 80-100° C. for 6-12 h to obtain pretreated straw powder;

III. mixing the pretreated straw powder prepared in step II with 1-3 g of potassium carbonate evenly; placing it into a furnace under a nitrogen atmosphere, heating the mixture to 600~800° C. at a rate of 8° C./min and maintaining this temperature for 2 hours; after cooling to room temperature, washing it three times sequentially with 0.2-0.5 mol/L dilute hydrochloric acid and water, placing it in an oven at 80-100° C. for 6-12 h to obtain phosphorus-doped straw-based porous carbon.

Preferably, in step I, the straw waste is any one of corn straw, cotton straw, wheat straw, rice straw, and straw after sugarcane pressing.

Preferably, a preparation method of the zinc oxide quantum dots comprises the following steps:

① weighing 10 mmoL of zinc salt and dissolving it in 100 mL of ethanol, dissolving evenly to obtain a zinc ion solution;

② adding the zinc ion solution prepared in step ① dropwise into 20-30 mL of 0.2 mol/L potassium hydroxide ethanol solution, stirring at 360-500 rpm for 6 to 8 hours; after the reaction is completed, centrifuging at 6000-10000 rpm to obtain a precipitate, washing the precipitate three times alternately with ethanol and deionized water, then drying it in a vacuum drying oven at 60° C. for 12 h to obtain the zinc oxide quantum dots.

Preferably, the silane coupling agent is any one of 3-aminopropyltriethoxysilane, epoxytrimethoxysilane and γ-glycidyloxypropyltrimethoxysilane.

The invention provides a preparation method for the modified straw waste composite board, comprising the following steps:

S1. according to the components of the protective layer in parts by weight, uniformly mixing phosphorus-doped straw-based porous carbon, polyvinyl acetate emulsion, hydroxymethyl cellulose, polyvinyl butyral-phenolic adhesive, polyvinyl alcohol, starch glue, and basalt fiber in a mixer to prepare a protective layer slurry; laying the bamboo fiber mesh and the glass fiber cloth separately on upper and lower surfaces of a mold, applying the prepared protective layer slurry evenly between the bamboo fiber mesh and the glass fiber cloth, adding a layer of basalt fiber mesh in their middle, achieving a total thickness of 0.8 to 1 cm; placing the mold in a hot press, heating it to 150° C., applying a pressure of 3 MPa, and maintaining this condition for 30 minutes, then cooling to room temperature to obtain the protective layer;

S2. according to the components of the weight reduction layer in parts by weight, uniformly mixing phosphorus-doped straw-based porous carbon, zinc oxide quantum dots, modified emulsified asphalt, fabric fiber, chopped glass fiber, urea-formaldehyde resin, and silane coupling agent in a mixer to prepare a weight reduction layer slurry; laying the metal mesh and the non-woven fiber cloth separately on upper and lower surfaces of a mold, applying the prepared weight reduction layer slurry evenly between the metal mesh and the non-woven fiber cloth, achieving a thickness of 1.5 to 2 cm; placing a hole-making template with a cylindrical shape of radius 0.6 cm in a center of the mold; placing the mold in the hot press, heating it to 150° C., applying a pressure of 3 MPa, and maintaining this condition for 30 minutes, then cooling to room temperature to obtain the weight reduction layer;

S3. according to the components of the substrate layer in parts by weight, uniformly mixing phosphorus-doped straw-based porous carbon, nano-silicon dioxide, silane coupling agent, starch glue, hydroxymethyl cellulose, foaming agent, ammonium chloride, modified urea-formaldehyde resin, hemp fiber and water in a mixer to prepare a substrate layer slurry; laying two sheets of non-woven fiber cloth separately on upper and lower surfaces of a mold, applying the prepared substrate layer slurry evenly between the two sheets of non-woven fiber cloth, achieving a thickness of 1 to 1.2 cm; placing the mold in the hot press, heating it to 160° C., applying a pressure of 3 MPa, and maintaining this condition for 40 minutes, then cooling to room temperature to obtain the substrate layer;

S4. according to the components of the surface layer in parts by weight, uniformly mixing phosphorus-doped straw-based porous carbon, zinc oxide quantum dots, magnesium oxide, magnesium chloride, 30 wt % hydrochloric acid, oxalic acid, hydroxyethyl cellulose, sodium lignosulfonate, white latex, polyvinyl alcohol, light calcium carbonate and water in a mixer to prepare a surface layer slurry; laying the glass fiber cloth and the non-woven fiber cloth on upper and lower surfaces of a mold, applying the prepared surface layer slurry evenly between the glass fiber cloth and the non-woven fiber cloth, achieving a thickness of 0.6 to 0.8 cm; placing the mold in the hot press, heating it to 150° C., applying a pressure of 3 MPa, and maintaining this condition for 30 minutes, then cooling to room temperature to obtain the surface layer;

S5. stacking the above prepared layers together in the order of the protective layer, the weight reduction layer, the substrate layer, and the surface layer from bottom to top, placing the stacked layers into a hot press, heating to 160° C., applying a pressure of 3.5 MPa, maintaining for 45 minutes, and then cooling to room temperature to obtain a formed composite board, cutting, polishing, and surface treating to obtain the modified straw waste composite board.

The invention achieves the following advantages:

the invention significantly enhances the comprehensive performance of composite boards by introducing innovative materials such as phosphorus-doped straw-based porous carbon, zinc oxide quantum dots, modified emulsified asphalt, and nano-silicon dioxide. Phosphorus-doped straw-based porous carbon is processed through phosphoric acid treatment and high-temperature carbonization of straw waste, provides straw waste with abundant pore structures and excellent mechanical properties, along with good flame retardancy and stability. Phosphorus-doped straw-based porous carbon not only achieves high-value utilization of agricultural waste, but also reduces environmental pollution, exhibits excellent corrosion resistance, and addresses the problems that traditional straw boards are prone to moisture absorption, mold, and decay. Zinc oxide quantum dots possess antibacterial properties, ensuring the stability of the boards even in humid environments and extending their lifespan. Additionally, the porous structure and high specific surface area of phosphorus-doped straw-based porous carbon enhance the uniformity of the material, and reduce the risk of cracking and deformation during processing; this results in smoother, denser board surfaces, enhancing aesthetics and decorative performance, and expanding its application range in high-end products.

The introduction of modified emulsified asphalt enables the boards to maintain lightweight properties while possessing excellent waterproof and corrosion-resistant capabilities, effectively addressing problems that traditional straw boards are prone to moisture absorption, mold, and decay. Nano-silicon dioxide improves the adhesion and uniformity of the material, thereby reducing the risk of cracking and deformation during processing, and enhancing the UV resistance and surface smoothness of the board, enhancing their aesthetics and decorative performance. Through scientifically designed components and advanced manufacturing processes, the invention comprehensively enhances the flame retardancy, tensile strength, durability, environmental performance, and processing capabilities of the modified straw waste composite boards; this not only solves the shortcomings of traditional boards, but also achieves high-value utilization of agricultural waste, providing new ideas and technical support for the development and application of environmentally friendly composite materials.

4. BRIEF DESCRIPTION OF ACCOMPANY DRAWINGS

In order to explain the technical schemes in the embodiments of the invention or prior art more clearly, the accompanying drawings needed to be used in the description of the embodiments or the prior art will be briefly introduced below. Obviously, the accompanying drawings in the following description are only are some embodiments of the invention. For those of ordinary skill in the art, other accompanying drawings can be obtained based on these accompanying drawings without exerting creative efforts.

Figure 1:
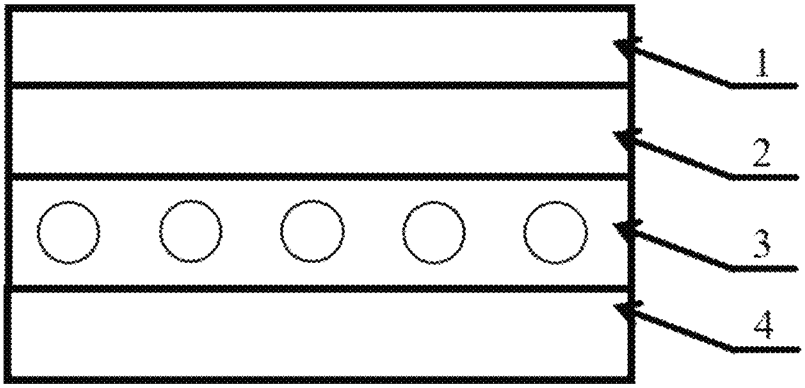
FIG. 1 is a schematic diagram of the structure of the modified straw waste composite board proposed by the invention.

Attached Drawings Marks: 1 surface layer; 2 substrate layer; 3 weight reduction layer; 4 protective layer.

5. SPECIFIC EMBODIMENT OF THE INVENTION

In order to make the objects, technical schemes and advantages of the invention clearer, the invention will be further described in detail below in combination with specific embodiments, but the invention is not limited to the following embodiments.

It should be noted that, unless otherwise specified, the chemical reagents involved in the invention were purchased through commercial channels.

Embodiment 1: the invention proposes a modified straw waste composite board, sequentially comprising a surface layer 1, a substrate layer 2, a weight reduction layer 3, and a protective layer 4 from top to bottom;

- the surface layer 1 comprises the following components in parts by weight: 30 parts of phosphorus-doped straw-based porous carbon, 20 parts of zinc oxide quantum dots, 50 parts of magnesium oxide, 40 parts of magnesium chloride, 0.6 parts of 30 wt % hydrochloric acid, 4 parts of oxalic acid, 4 parts of hydroxyethyl cellulose, 0.5 parts of sodium lignosulfonate, 2 parts of white latex, 6 parts of polyvinyl alcohol, 5 parts of light calcium carbonate and 50 parts of water, as well as a glass fiber cloth and a non-woven fiber cloth;
- the substrate layer 2 comprises the following components in parts by weight: 100 parts of phosphorus-doped straw-based porous carbon, 6 parts of nano-silicon dioxide, 2 parts of 3-aminopropyltriethoxysilane, 20 parts of starch glue, 4 parts of hydroxymethyl cellulose, 4 parts of foaming agent, 0.2 parts of ammonium chloride, 5 parts of modified urea-formaldehyde resin, 3 parts of hemp fiber, 50 parts of water, and two sheets of non-woven fiber cloth;
- the weight reduction layer 3 comprises the following components in parts by weight: 60 parts of phosphorus-doped straw-based porous carbon, 5 parts of zinc oxide quantum dots, 4 parts of modified emulsified asphalt, 3 parts of fabric fiber, 1 part of chopped glass fiber, 3 parts of urea-formaldehyde resin and 3 parts of 3-aminopropyltriethoxysilane, as well as a metal mesh and a non-woven fiber cloth;
- the protective layer 4 comprises the following components in parts by weight: 40 parts of phosphorus-doped straw-based porous carbon, 6 parts of polyvinyl acetate emulsion, 1.6 parts of hydroxymethyl cellulose, 0.8 parts of polyvinyl butyral-phenolic adhesive, 3 parts of polyvinyl alcohol, 10 parts of starch glue and 4 parts of basalt fiber, as well as a bamboo fiber mesh, a glass fiber cloth and a basalt fiber mesh.

A method for preparing the phosphorus-doped straw-based porous carbon comprises the following steps:

- I. washing the corn straw twice with water and air-drying it, then feeding it into a grinder for crushing to obtain straw powder with a particle size of 2±0.5 mm;
- II. Weighing 5 g of the straw powder prepared in step I, adding it to 200 mL of 2 mol/L phosphoric acid solution, mixing thoroughly, and then transferring the mixture to a reactor lined with polytetrafluoroethylene, heating the mixture at 160° C. for 12 hours; after cooling to room temperature, filtering to collect precipitate, placing it in an oven at 100° C. for 6 h to obtain pretreated straw powder;
- III. mixing the pretreated straw powder prepared in step II with 3 g of potassium carbonate evenly; placing it into a furnace under a nitrogen atmosphere, heating the mixture to 800° C. at a rate of 8° C./min and maintaining this temperature for 2 hours; after cooling to room temperature, washing it three times sequentially with 0.5 mol/L dilute hydrochloric acid and water, placing it in an oven at 100° C. for 6 h to obtain phosphorus-doped straw-based porous carbon.

A preparation method of the zinc oxide quantum dots comprises the following steps:

- ① weighing 10 mmoL of zinc salt and dissolving it in 100 mL of ethanol, dissolving evenly to obtain a zinc ion solution;
- ② adding the zinc ion solution prepared in step ① dropwise into 20 mL of 0.2 mol/L potassium hydroxide ethanol solution, stirring at 360 rpm for 8 hours; after the reaction is completed, centrifuging at 10000 rpm to obtain a precipitate, washing the precipitate three times alternately with ethanol and deionized water, then drying it in a vacuum drying oven at 60° C. for 12 h to obtain the zinc oxide quantum dots.

This embodiment also provides a preparation method for the modified straw waste composite board, comprising the following steps:

- S1. according to the components of the protective layer 4 in parts by weight, uniformly mixing phosphorus-doped straw-based porous carbon, polyvinyl acetate emulsion, hydroxymethyl cellulose, polyvinyl butyral-phenolic adhesive, polyvinyl alcohol, starch glue, and basalt fiber in a mixer to prepare a protective layer slurry; laying the bamboo fiber mesh and the glass fiber cloth separately on upper and lower surfaces of a mold, applying the prepared protective layer slurry evenly between the bamboo fiber mesh and the glass fiber cloth, adding a layer of basalt fiber mesh in their middle, achieving a total thickness of 0.8 cm; placing the mold in a hot press, heating it to 150° C., applying a pressure of 3 MPa, and maintaining this condition for 30 minutes, then cooling to room temperature to obtain the protective layer 4;
- S2. according to the components of the weight reduction layer 3 in parts by weight, uniformly mixing phosphorus-doped straw-based porous carbon, zinc oxide quantum dots, modified emulsified asphalt, fabric fiber, chopped glass fiber, urea-formaldehyde resin, and 3-aminopropyltriethoxysilane in a mixer to prepare a weight reduction layer slurry; laying the metal mesh and the non-woven fiber cloth separately on upper and lower surfaces of a mold, applying the prepared weight reduction layer slurry evenly between the metal mesh and the non-woven fiber cloth, achieving a thickness of 2 cm; placing a hole-making template with a cylindrical shape of radius 0.6 cm in a center of the mold; placing the mold in the hot press, heating it to 150° C., applying a pressure of 3 MPa, and maintaining this condition for 30 minutes, then cooling to room temperature to obtain the weight reduction layer 3;
- S3. according to the components of the substrate layer 2 in parts by weight, uniformly mixing phosphorus-doped straw-based porous carbon, nano-silicon dioxide, 3-aminopropyltriethoxysilane, starch glue, hydroxymethyl cellulose, foaming agent, ammonium chloride, modified urea-formaldehyde resin, hemp fiber and water in a mixer to prepare a substrate layer slurry; laying two sheets of non-woven fiber cloth separately on upper and lower surfaces of a mold, applying the prepared substrate layer slurry evenly between the two sheets of non-woven fiber cloth, achieving a thickness of 1.1 cm; placing the mold in the hot press, heating it to 160° C., applying a pressure of 3 MPa, and maintaining this condition for 40 minutes, then cooling to room temperature to obtain the substrate layer 2;

S4. according to the components of the surface layer 1 in parts by weight, uniformly mixing phosphorus-doped straw-based porous carbon, zinc oxide quantum dots, magnesium oxide, magnesium chloride, 30 wt % hydrochloric acid, oxalic acid, hydroxyethyl cellulose, sodium lignosulfonate, white latex, polyvinyl alcohol, light calcium carbonate and water in a mixer to prepare a surface layer slurry; laying the glass fiber cloth and the non-woven fiber cloth on upper and lower surfaces of a mold, applying the prepared surface layer slurry evenly between the glass fiber cloth and the non-woven fiber cloth, achieving a thickness of 0.6 cm; placing the mold in the hot press, heating it to 150° C., applying a pressure of 3 MPa, and maintaining this condition for 30 minutes, then cooling to room temperature to obtain the surface layer 1;

S5. stacking the above prepared layers together in the order of the protective layer 4, the weight reduction layer 3, the substrate layer 2, and the surface layer 1 from bottom to top, placing the stacked layers into a hot press, heating to 160° C., applying a pressure of 3.5 MPa, maintaining for 45 minutes, and then cooling to room temperature to obtain a formed composite board, cutting, polishing, and surface treating to obtain the modified straw waste composite board.

Embodiment 2: the invention proposes a modified straw waste composite board, sequentially comprising a surface layer 1, a substrate layer 2, a weight reduction layer 3, and a protective layer 4 from top to bottom;

the surface layer 1 comprises the following components in parts by weight: 25 parts of phosphorus-doped straw-based porous carbon, 15 parts of zinc oxide quantum dots, 70 parts of magnesium oxide, 30 parts of magnesium chloride, 0.4 parts of 30 wt % hydrochloric acid, 1 part of oxalic acid, 3 parts of hydroxyethyl cellulose, 0.8 parts of sodium lignosulfonate, 1.6 parts of white latex, 2 parts of polyvinyl alcohol, 3 parts of light calcium carbonate and 50 parts of water, as well as a glass fiber cloth and a non-woven fiber cloth;

the substrate layer 2 comprises the following components in parts by weight: 60 parts of phosphorus-doped straw-based porous carbon, 4 parts of nano-silicon dioxide, 4 parts of epoxytrimethoxysilane, 40 parts of starch glue, 7 parts of hydroxymethyl cellulose, 1 part of foaming agent, 0.4 parts of ammonium chloride, 12 parts of modified urea-formaldehyde resin, 1 part of hemp fiber, 50 parts of water, and two sheets of non-woven fiber cloth;

the weight reduction layer 3 comprises the following components in parts by weight: 80 parts of phosphorus-doped straw-based porous carbon, 10 parts of zinc oxide quantum dots, 6 parts of modified emulsified asphalt, 8 parts of fabric fiber, 4 parts of chopped glass fiber, 5 parts of urea-formaldehyde resin and 0.5 parts of epoxytrimethoxysilane, as well as a metal mesh and a non-woven fiber cloth;

the protective layer 4 comprises the following components in parts by weight: 60 parts of phosphorus-doped straw-based porous carbon, 14 parts of polyvinyl acetate emulsion, 2 parts of hydroxymethyl cellulose, 1.5 parts of polyvinyl butyral-phenolic adhesive, 4 parts of polyvinyl alcohol, 6 parts of starch glue and 8 parts of basalt fiber, as well as a bamboo fiber mesh, a glass fiber cloth and a basalt fiber mesh.

A method for preparing the phosphorus-doped straw-based porous carbon comprises the following steps:

I. washing the cotton straw twice with water and air-drying it, then feeding it into a grinder for crushing to obtain straw powder with a particle size of 2±0.5 mm;

II. Weighing 3 g of the straw powder prepared in step I, adding it to 200 mL of 1 mol/L phosphoric acid solution, mixing thoroughly, and then transferring the mixture to a reactor lined with polytetrafluoroethylene, heating the mixture at 200° C. for 8 hours; after cooling to room temperature, filtering to collect precipitate, placing it in an oven at 80° C. for 10 h to obtain pretreated straw powder;

III. mixing the pretreated straw powder prepared in step II with 2 g of potassium carbonate evenly; placing it into a furnace under a nitrogen atmosphere, heating the mixture to 600° C. at a rate of 8° C./min and maintaining this temperature for 2 hours; after cooling to room temperature, washing it three times sequentially with 0.2 mol/L dilute hydrochloric acid and water, placing it in an oven at 80° C. for 8 h to obtain phosphorus-doped straw-based porous carbon.

A preparation method of the zinc oxide quantum dots comprises the following steps:

① weighing 10 mmoL of zinc salt and dissolving it in 100 mL of ethanol, dissolving evenly to obtain a zinc ion solution;

② adding the zinc ion solution prepared in step ① dropwise into 30 mL of 0.2 mol/L potassium hydroxide ethanol solution, stirring at 400 rpm for 7 hours; after the reaction is completed, centrifuging at 8000 rpm to obtain a precipitate, washing the precipitate three times alternately with ethanol and deionized water, then drying it in a vacuum drying oven at 60° C. for 12 h to obtain the zinc oxide quantum dots.

This embodiment also provides a preparation method for the modified straw waste composite board, comprising the following steps:

S1. according to the components of the protective layer 4 in parts by weight, uniformly mixing phosphorus-doped straw-based porous carbon, polyvinyl acetate emulsion, hydroxymethyl cellulose, polyvinyl butyral-phenolic adhesive, polyvinyl alcohol, starch glue, and basalt fiber in a mixer to prepare a protective layer slurry; laying the bamboo fiber mesh and the glass fiber cloth separately on upper and lower surfaces of a mold, applying the prepared protective layer slurry evenly between the bamboo fiber mesh and the glass fiber cloth, adding a layer of basalt fiber mesh in their middle, achieving a total thickness of 1 cm; placing the mold in a hot press, heating it to 150° C., applying a pressure of 3 MPa, and maintaining this condition for 30 minutes, then cooling to room temperature to obtain the protective layer 4;

S2. according to the components of the weight reduction layer 3 in parts by weight, uniformly mixing phosphorus-doped straw-based porous carbon, zinc oxide quantum dots, modified emulsified asphalt, fabric fiber, chopped glass fiber, urea-formaldehyde resin, and epoxytrimethoxysilane in a mixer to prepare a weight reduction layer slurry; laying the metal mesh and the non-woven fiber cloth separately on upper and lower surfaces of a mold, applying the prepared weight reduction layer slurry evenly between the metal mesh and the non-woven fiber cloth, achieving a thickness of 1.5 cm; placing a hole-making template with a cylindrical shape of radius 0.6 cm in a center of the mold; placing the mold in the hot press, heating it to 150° C., applying a pressure of 3 MPa, and maintaining this condition for 30 minutes, then cooling to room temperature to obtain the weight reduction layer 3;

S3. according to the components of the substrate layer 2 in parts by weight, uniformly mixing phosphorus-doped straw-based porous carbon, nano-silicon dioxide, epoxytrimethoxysilane, starch glue, hydroxymethyl cellulose, foaming agent, ammonium chloride, modified urea-formaldehyde resin, hemp fiber and water in a mixer to prepare a substrate layer slurry; laying two sheets of non-woven fiber cloth separately on upper and lower surfaces of a mold, applying the prepared substrate layer slurry evenly between the two sheets of non-woven fiber cloth, achieving a thickness of 1 cm; placing the mold in the hot press, heating it to 160° C., applying a pressure of 3 MPa, and maintaining this condition for 40 minutes, then cooling to room temperature to obtain the substrate layer 2;

S4. according to the components of the surface layer 1 in parts by weight, uniformly mixing phosphorus-doped straw-based porous carbon, zinc oxide quantum dots, magnesium oxide, magnesium chloride, 30 wt % hydrochloric acid, oxalic acid, hydroxyethyl cellulose, sodium lignosulfonate, white latex, polyvinyl alcohol, light calcium carbonate and water in a mixer to prepare a surface layer slurry; laying the glass fiber cloth and the non-woven fiber cloth on upper and lower surfaces of a mold, applying the prepared surface layer slurry evenly between the glass fiber cloth and the non-woven fiber cloth, achieving a thickness of 0.8 cm; placing the mold in the hot press, heating it to 150° C., applying a pressure of 3 MPa, and maintaining this condition for 30 minutes, then cooling to room temperature to obtain the surface layer 1;

S5. stacking the above prepared layers together in the order of the protective layer 4, the weight reduction layer 3, the substrate layer 2, and the surface layer 1 from bottom to top, placing the stacked layers into a hot press, heating to 160° C., applying a pressure of 3.5 MPa, maintaining for 45 minutes, and then cooling to room temperature to obtain a formed composite board, cutting, polishing, and surface treating to obtain the modified straw waste composite board.

Embodiment 3: the invention proposes a modified straw waste composite board, sequentially comprising a surface layer 1, a substrate layer 2, a weight reduction layer 3, and a protective layer 4 from top to bottom;

the surface layer 1 comprises the following components in parts by weight: 43 parts of phosphorus-doped straw-based porous carbon, 10 parts of zinc oxide quantum dots, 100 parts of magnesium oxide, 36 parts of magnesium chloride, 0.5 parts of 30 wt % hydrochloric acid, 6 parts of oxalic acid, 6 parts of hydroxyethyl cellulose, 0.6 parts of sodium lignosulfonate, 1.8 parts of white latex, 4 parts of polyvinyl alcohol, 8 parts of light calcium carbonate and 50 parts of water, as well as a glass fiber cloth and a non-woven fiber cloth;

the substrate layer 2 comprises the following components in parts by weight: 40 parts of phosphorus-doped straw-based porous carbon, 5 parts of nano-silicon dioxide, 1 part of γ-glycidyloxypropyltrimethoxysilane, 30 parts of starch glue, 6 parts of hydroxymethyl cellulose, 10 parts of foaming agent, 0.3 parts of ammonium chloride, 2 parts of modified urea-formaldehyde resin, 2 parts of hemp fiber, 50 parts of water, and two sheets of non-woven fiber cloth;

the weight reduction layer 3 comprises the following components in parts by weight: 100 parts of phosphorus-doped straw-based porous carbon, 7 parts of zinc oxide quantum dots, 12 parts of modified emulsified asphalt, 6 parts of fabric fiber, 6 parts of chopped glass fiber, 8 parts of urea-formaldehyde resin and 5 parts of γ-glycidyloxypropyltrimethoxysilane, as well as a metal mesh and a non-woven fiber cloth;

the protective layer 4 comprises the following components in parts by weight: 50 parts of phosphorus-doped straw-based porous carbon, 10 parts of polyvinyl acetate emulsion, 3 parts of hydroxymethyl cellulose, 1 part of polyvinyl butyral-phenolic adhesive, 6 parts of polyvinyl alcohol, 1 part of starch glue and 1 part of basalt fiber, as well as a bamboo fiber mesh, a glass fiber cloth and a basalt fiber mesh.

A method for preparing the phosphorus-doped straw-based porous carbon comprises the following steps:

I. washing the wheat straw twice with water and air-drying it, then feeding it into a grinder for crushing to obtain straw powder with a particle size of 2±0.5 mm;

II. Weighing 4 g of the straw powder prepared in step I, adding it to 200 mL of 1.5 mol/L phosphoric acid solution, mixing thoroughly, and then transferring the mixture to a reactor lined with polytetrafluoroethylene, heating the mixture at 180° C. for 10 hours; after cooling to room temperature, filtering to collect precipitate, placing it in an oven at 90° C. for 12 h to obtain pretreated straw powder;

III. mixing the pretreated straw powder prepared in step II with 1 g of potassium carbonate evenly; placing it into a furnace under a nitrogen atmosphere, heating the mixture to 700° C. at a rate of 8° C./min and maintaining this temperature for 2 hours; after cooling to room temperature, washing it three times sequentially with 0.3 mol/L dilute hydrochloric acid and water, placing it in an oven at 90° C. for 12 h to obtain phosphorus-doped straw-based porous carbon.

A preparation method of the zinc oxide quantum dots comprises the following steps:

① weighing 10 mmoL of zinc salt and dissolving it in 100 mL of ethanol, dissolving evenly to obtain a zinc ion solution;

② adding the zinc ion solution prepared in step ① dropwise into 25 mL of 0.2 mol/L potassium hydroxide ethanol solution, stirring at 500 rpm for 6 hours; after the reaction is completed, centrifuging at 6000 rpm to obtain a precipitate, washing the precipitate three times alternately with ethanol and deionized water, then drying it in a vacuum drying oven at 60° C. for 12 h to obtain the zinc oxide quantum dots.

This embodiment also provides a preparation method for the modified straw waste composite board, comprising the following steps:

S1. according to the components of the protective layer 4 in parts by weight, uniformly mixing phosphorus-doped straw-based porous carbon, polyvinyl acetate emulsion, hydroxymethyl cellulose, polyvinyl butyral-phenolic adhesive, polyvinyl alcohol, starch glue, and basalt fiber in a mixer to prepare a protective layer slurry; laying the bamboo fiber mesh and the glass fiber cloth separately on upper and lower surfaces of a mold, applying the prepared protective layer slurry evenly between the bamboo fiber mesh and the glass fiber cloth, adding a layer of basalt fiber mesh in their middle, achieving a total thickness of 0.9 cm; placing the mold in a hot press, heating it to 150° C., applying a pressure of 3 MPa, and maintaining this condition for 30 minutes, then cooling to room temperature to obtain the protective layer 4;

S2. according to the components of the weight reduction layer 3 in parts by weight, uniformly mixing phosphorus-doped straw-based porous carbon, zinc oxide quantum dots, modified emulsified asphalt, fabric fiber, chopped glass fiber, urea-formaldehyde resin, and γ-glycidyloxypropyltrimethoxysilane in a mixer to prepare a weight reduction layer slurry; laying the metal mesh and the non-woven fiber cloth separately on upper and lower surfaces of a mold, applying the prepared weight reduction layer slurry evenly between the metal mesh and the non-woven fiber cloth, achieving a thickness of 1.6 cm; placing a hole-making template with a cylindrical shape of radius 0.6 cm in a center of the mold; placing the mold in the hot press, heating it to 150° C., applying a pressure of 3 MPa, and maintaining this condition for 30 minutes, then cooling to room temperature to obtain the weight reduction layer 3;

S3. according to the components of the substrate layer 2 in parts by weight, uniformly mixing phosphorus-doped straw-based porous carbon, nano-silicon dioxide, γ-glycidyloxypropyltrimethoxysilane, starch glue, hydroxymethyl cellulose, foaming agent, ammonium chloride, modified urea-formaldehyde resin, hemp fiber and water in a mixer to prepare a substrate layer slurry; laying two sheets of non-woven fiber cloth separately on upper and lower surfaces of a mold, applying the prepared substrate layer slurry evenly between the two sheets of non-woven fiber cloth, achieving a thickness of 1.2 cm; placing the mold in the hot press, heating it to 160° C., applying a pressure of 3 MPa, and maintaining this condition for 40 minutes, then cooling to room temperature to obtain the substrate layer 2;

S4. according to the components of the surface layer 1 in parts by weight, uniformly mixing phosphorus-doped straw-based porous carbon, zinc oxide quantum dots, magnesium oxide, magnesium chloride, 30 wt % hydrochloric acid, oxalic acid, hydroxyethyl cellulose, sodium lignosulfonate, white latex, polyvinyl alcohol, light calcium carbonate and water in a mixer to prepare a surface layer slurry; laying the glass fiber cloth and the non-woven fiber cloth on upper and lower surfaces of a mold, applying the prepared surface layer slurry evenly between the glass fiber cloth and the non-woven fiber cloth, achieving a thickness of 0.7 cm; placing the mold in the hot press, heating it to 150° C., applying a pressure of 3 MPa, and maintaining this condition for 30 minutes, then cooling to room temperature to obtain the surface layer 1;

S5. stacking the above prepared layers together in the order of the protective layer 4, the weight reduction layer 3, the substrate layer 2, and the surface layer 1 from bottom to top, placing the stacked layers into a hot press, heating to 160° C., applying a pressure of 3.5 MPa, maintaining for 45 minutes, and then cooling to room temperature to obtain a formed composite board, cutting, polishing, and surface treating to obtain the modified straw waste composite board.

Comparative Example 1: this comparative example proposes a composite board, which differs from Embodiment 1 only in that phosphorus-doped straw-based porous carbon is not added, and the remaining components, component contents, and experimental steps are the same as those of Embodiment 1.

Comparative Example 2: this comparative example proposes a modified straw waste composite board, which differs from Embodiment 1 only in that zinc oxide quantum dots are not added, and the remaining components, component contents, and experimental steps are the same as those of Embodiment 1.

Experimental Example 1: microscopic morphology of the phosphorus-doped straw-based porous carbon prepared in Embodiment 1 was observed by using a scanning electron microscope, and microscopic morphology of the zinc oxide quantum dots prepared in Embodiment 1 was observed by using a transmission electron microscope.

Figure 2:
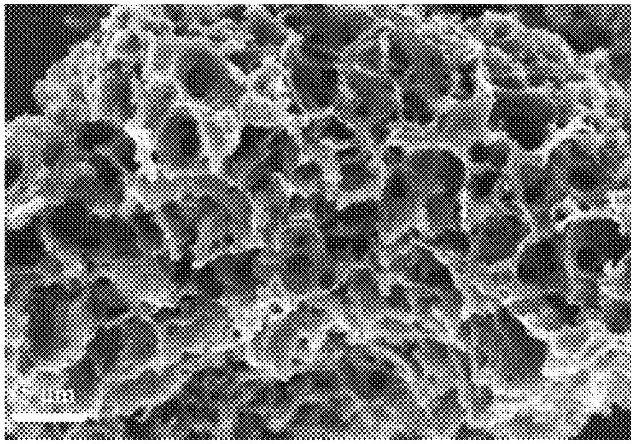
FIG. 2 is a scanning electron microscope image of the phosphorus-doped straw-based porous carbon prepared in Embodiment 1.
Figure 3:
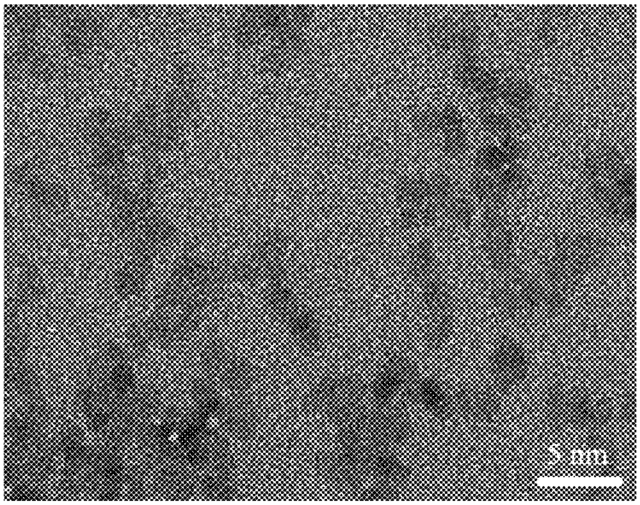
FIG. 3 is a transmission electron microscope image of the zinc oxide quantum dots prepared in Embodiment 1.

FIG. 2 is a scanning electron microscope image of the phosphorus-doped straw-based porous carbon prepared in Embodiment 1; as shown in the figure, the surface of the phosphorus-doped straw-based porous carbon has an obvious porous structure and a rough surface structure, indicating that the phosphorus-doped straw-based porous carbon is successfully prepared. FIG. 3 is a transmission electron microscope image of the zinc oxide quantum dots prepared in Embodiment 1; as shown in the figure, the zinc oxide quantum dots have a small particle size, a diameter of about 3 nm, and a relatively uniform distribution, indicating that the zinc oxide quantum dots are successfully prepared.

Experimental Example 2: performance testing:

burning behavior test: according to the standard GB/T 8624-2012 "Classification for Burning Behavior of Building Materials and Products", materials can be classified into the following grades: A, non-combustible; B1, difficult-to-ignite; B2, normal combustibility; B3, easily ignited;

thermal conductivity: measured using a Thermal Conductivity Tester (TPS2500S, Sweden).

weather resistance: tested in accordance with the standard GB/T 2423.3 "Environmental Testing-Part 2: Tests-Test Cab: Damp Heat, Steady State." The test observes whether there are any cracks or blisters on the surface of the composite board after being exposed to high and low temperature damp heat conditions for 2000 hours;

tensile strength: determined in compliance with the standard JG/T 287-2013 "Materials of External Thermal Insulation Systems Based on Insulated Decorative Panel." The test results for the composite boards prepared in Embodiments 1-3 and Comparative Examples 1-2 are shown in Table 1.

| | Burning Behavior | Thermal Conductivity (W/(m · k)) | Weather Resistance | Tensile Strength (MPa) |
|---|---|---|---|---|
| Embodiment 1 | A | 0.105 | no cracking, no blistering | 228 |
| Embodiment 2 | A | 0.125 | no cracking, no blistering | 224 |
| Embodiment 3 | A | 0.112 | no cracking, no blistering | 231 |
| Comparative Example 1 | B1 | 0.323 | cracked, no blistering | 148 |

-continued

| | Burning Behavior | Thermal Conductivity (W/(m · k)) | Weather Resistance | Tensile Strength (MPa) |
|---|---|---|---|---|
| Comparative Example 2 | A | 0.101 | no cracking, blistering | 225 |

As shown in the table above, the composite boards prepared in Embodiments 1-3 and the Comparative Example 2 are all non-combustible materials; this is due to the flame-retardant properties imparted by the added inorganic materials and phosphorus-doped straw-based porous carbon; Comparative Example 1 is difficult-to-ignite material, indicating that phosphorus-doped straw-based porous carbon plays a significant role in enhancing the flame-retardant properties of the composite boards. Embodiments 1-3 and Comparative Example 2 all have low thermal conductivity, indicating good thermal insulation performance; the thermal conductivity of Comparative Example 1 is 0.323 W/(m·K), showing that phosphorus-doped straw-based porous carbon plays an important role in reducing thermal conductivity and improving thermal insulation performance. The weather resistance test results of the composite boards prepared in Embodiments 1-3 all show no cracking or blistering, indicating excellent weather resistance in high and low temperature humid environments; the composite boards prepared in Comparative Example 1 exhibit cracking but no blistering; the composite boards in Comparative Example 2 show no cracking but some blistering, demonstrating that the porous structure and high specific surface area of phosphorus-doped straw-based porous carbon enhance the uniformity of the material, the UV absorption and antibacterial properties of zinc oxide quantum dots can extend the material's lifespan. The composite boards prepared in Embodiments 1-3 and Comparative Example 2 exhibit high tensile strength, whereas the tensile strength of the composite boards prepared in Comparative Example 1 is significantly lower than that in Embodiment 1, indicating phosphorus-doped straw-based porous carbon plays a crucial role in improving tensile strength.

The invention and its embodiments are described above, this description is not restrictive, and what is shown in the accompanying drawing is only one of the embodiments of the invention, and the actual application is not limited to this. All in all, if those skilled in the art receives its enlightenment, without deviating from the object of the invention, and without creatively designing structures and embodiments similar to the technical scheme of the invention shall fall within the protection scope of the invention.

The invention claimed is:

1. A modified straw waste composite board, sequentially comprising a surface layer, a substrate layer, a weight reduction layer, and a protective layer from top to bottom;

the surface layer comprises the following components in parts by weight: 25-43 parts of phosphorus-doped straw-based porous carbon, 10-20 parts of zinc oxide quantum dots, 50-100 parts of magnesium oxide, 30-40 parts of magnesium chloride, 0.4-0.6 parts of 30 wt % hydrochloric acid, 1-6 parts of oxalic acid, 3-6 parts of hydroxyethyl cellulose, 0.5-0.8 parts of sodium lignosulfonate, 1.6-2 parts of white latex, 2-6 parts of polyvinyl alcohol, 3-8 parts of light calcium carbonate and 50 parts of water, as well as a glass fiber cloth and a non-woven fiber cloth;

the substrate layer comprises the following components in parts by weight: 40-100 parts of phosphorus-doped straw-based porous carbon, 4-6 parts of nano-silicon dioxide, 1-4 parts of silane coupling agent, 20-40 parts of starch glue, 4-7 parts of hydroxymethyl cellulose, 1-10 parts of foaming agent, 0.2-0.4 parts of ammonium chloride, 2-12 parts of modified urea-formaldehyde resin, 1-3 parts of hemp fiber, 50 parts of water, and two sheets of non-woven fiber cloth;

the weight reduction layer comprises the following components in parts by weight: 60-100 parts of phosphorus-doped straw-based porous carbon, 5-10 parts of zinc oxide quantum dots, 4-12 parts of modified emulsified asphalt, 3-8 parts of fabric fiber, 1-6 parts of chopped glass fiber, 3-8 parts of urea-formaldehyde resin and 0.5-5 parts of silane coupling agent, as well as a metal mesh and a non-woven fiber cloth;

the protective layer comprises the following components in parts by weight: 40-60 parts of phosphorus-doped straw-based porous carbon, 6-14 parts of polyvinyl acetate emulsion, 1.6-3 parts of hydroxymethyl cellulose, 0.8-1.5 parts of polyvinyl butyral-phenolic adhesive, 3-6 parts of polyvinyl alcohol, 1-10 parts of starch glue and 1-8 parts of basalt fiber, as well as a bamboo fiber mesh, a glass fiber cloth and a basalt fiber mesh.

2. The modified straw waste composite board of claim 1, wherein a method for preparing the phosphorus-doped straw-based porous carbon comprises the following steps:

I. cleaning and air-drying the straw waste, then grinding it to obtain straw powder;

II. weighing the straw powder prepared in step I, adding it to a phosphoric acid solution, mixing thoroughly, and then transferring the mixture to a reactor, heating the mixture at 160-200° C. for 8-12 hours; after cooling to room temperature, filtering to collect precipitate, drying to obtain pretreated straw powder;

III. mixing the pretreated straw powder prepared in step II with potassium carbonate evenly; under a nitrogen atmosphere, heating the mixture to 600~800° C. and maintaining this temperature for 2 hours; after cooling to room temperature, washing and drying it to obtain phosphorus-doped straw-based porous carbon.

3. The modified straw waste composite board of claim 2, wherein in step I, the straw waste is any one of corn straw, cotton straw, wheat straw, rice straw, and straw after sugarcane pressing.

4. The modified straw waste composite board of claim 3, wherein a preparation method of the zinc oxide quantum dots comprises the following steps:

① weighing zinc salt and dissolving it in ethanol, dissolving evenly to obtain a zinc ion solution;

② adding the zinc ion solution prepared in step ① dropwise into a potassium hydroxide ethanol solution, stirring for 6 to 8 hours; after the reaction is completed, centrifuging to obtain a precipitate, washing and drying the precipitate to obtain the zinc oxide quantum dots.

5. The modified straw waste composite board of claim 4, wherein the silane coupling agent is any one of 3-aminopropyltriethoxysilane, epoxytrimethoxysilane and γ-glycidyloxypropyltrimethoxysilane.

6. A preparation method for the modified straw waste composite board of claim 5, comprising the following steps:

S1. according to the components of the protective layer in parts by weight, uniformly mixing phosphorus-doped straw-based porous carbon, polyvinyl acetate emulsion, hydroxymethyl cellulose, polyvinyl butyral-phenolic adhesive, polyvinyl alcohol, starch glue, and basalt fiber in a mixer to prepare a protective layer slurry; laying the bamboo fiber mesh and the glass fiber cloth separately on upper and lower surfaces of a mold, applying the prepared protective layer slurry evenly between the bamboo fiber mesh and the glass fiber cloth, adding a layer of basalt fiber mesh in their middle, achieving a total thickness of 0.8 to 1 cm; placing the mold in a hot press, heating it to 150° C., applying a pressure of 3 MPa, and maintaining this condition for 30 minutes, then cooling to room temperature to obtain the protective layer;

S2. according to the components of the weight reduction layer in parts by weight, uniformly mixing phosphorus-doped straw-based porous carbon, zinc oxide quantum dots, modified emulsified asphalt, fabric fiber, chopped glass fiber, urea-formaldehyde resin, and silane coupling agent in a mixer to prepare a weight reduction layer slurry; laying the metal mesh and the non-woven fiber cloth separately on upper and lower surfaces of a mold, applying the prepared weight reduction layer slurry evenly between the metal mesh and the non-woven fiber cloth, achieving a thickness of 1.5 to 2 cm; placing a hole-making template with a cylindrical shape of radius 0.6 cm in a center of the mold; placing the mold in the hot press, heating it to 150° C., applying a pressure of 3 MPa, and maintaining this condition for 30 minutes, then cooling to room temperature to obtain the weight reduction layer;

S3. according to the components of the substrate layer in parts by weight, uniformly mixing phosphorus-doped straw-based porous carbon, nano-silicon dioxide, silane coupling agent, starch glue, hydroxymethyl cellulose, foaming agent, ammonium chloride, modified urea-formaldehyde resin, hemp fiber and water in a mixer to prepare a substrate layer slurry; laying two sheets of non-woven fiber cloth separately on upper and lower surfaces of a mold, applying the prepared substrate layer slurry evenly between the two sheets of non-woven fiber cloth, achieving a thickness of 1 to 1.2 cm; placing the mold in the hot press, heating it to 160° C., applying a pressure of 3 MPa, and maintaining this condition for 40 minutes, then cooling to room temperature to obtain the substrate layer;

S4. according to the components of the surface layer in parts by weight, uniformly mixing phosphorus-doped straw-based porous carbon, zinc oxide quantum dots, magnesium oxide, magnesium chloride, 30 wt % hydrochloric acid, oxalic acid, hydroxyethyl cellulose, sodium lignosulfonate, white latex, polyvinyl alcohol, light calcium carbonate and water in a mixer to prepare a surface layer slurry; laying the glass fiber cloth and the non-woven fiber cloth on upper and lower surfaces of a mold, applying the prepared surface layer slurry evenly between the glass fiber cloth and the non-woven fiber cloth, achieving a thickness of 0.6 to 0.8 cm; placing the mold in the hot press, heating it to 150° C., applying a pressure of 3 MPa, and maintaining this condition for 30 minutes, then cooling to room temperature to obtain the surface layer;

S5. stacking the above prepared layers together in the order of the protective layer, the weight reduction layer, the substrate layer, and the surface layer from bottom to top, placing the stacked layers into a hot press, heating to 160° C., applying a pressure of 3.5 MPa, maintaining for 45 minutes, and then cooling to room temperature to obtain a formed composite board, cutting, polishing, and surface treating to obtain the modified straw waste composite board.

* * * * *